(12) United States Patent
Meulenbrugge et al.

(10) Patent No.: US 7,173,095 B2
(45) Date of Patent: Feb. 6, 2007

(54) POLYMERIZATION PROCESS INVOLVING THE DOSING INITIATORS

(75) Inventors: Lambertus Meulenbrugge, Westervoort (NL); Andreas Petrus Van Swieten, Velp (NL); Koen Antoon Kornelis Vanduffel, Deventer (NL); Hans Westmijze, Bathmen (NL)

(73) Assignee: Akzo Nobel N. V., Arnhem (NL)

( * ) Notice: Subject to any disclaimer, the term of this patent is extended or adjusted under 35 U.S.C. 154(b) by 0 days.

(21) Appl. No.: 10/559,775

(22) PCT Filed: Jun. 15, 2004

(86) PCT No.: PCT/EP2004/006536

§ 371 (c)(1), (2), (4) Date: Feb. 1, 2006

(87) PCT Pub. No.: WO2004/113392

PCT Pub. Date: Dec. 29, 2004

(65) Prior Publication Data

US 2006/0122339 A1   Jun. 8, 2006

Related U.S. Application Data

(60) Provisional application No. 60/480,283, filed on Jun. 20, 2003.

(51) Int. Cl.
*C08F 4/34* (2006.01)
*C08F 2/00* (2006.01)

(52) U.S. Cl. .................. 526/86; 526/81; 526/344.2

(58) Field of Classification Search .................. 526/81, 526/86, 344.2
See application file for complete search history.

(56) References Cited

U.S. PATENT DOCUMENTS

| | | | |
|---|---|---|---|
| 3,451,985 A * | 6/1969 | Mahlo | ......................... 526/86 |
| 3,636,326 A | 1/1972 | Smith et al. | |
| 4,133,791 A | 1/1979 | Kemenater et al. | |
| 4,806,836 A | 2/1989 | Webb | |
| 6,106,785 A | 8/2000 | Havlena et al. | |
| 6,440,374 B1 | 8/2002 | Jelinek et al. | |
| 6,639,037 B2 * | 10/2003 | Van Swieten et al. | ... 526/344.2 |
| 6,644,332 B1 | 11/2003 | Winkler et al. | |
| 2001/0004461 A1 | 6/2001 | Moore, Jr. et al. | |
| 2001/0042378 A1 | 11/2001 | Pfister et al. | |
| 2003/0105247 A1 | 6/2003 | Braganca et al. | |
| 2003/0199656 A1 | 10/2003 | Westmijze et al. | |
| 2005/0080207 A1 | 4/2005 | Meulenbrugge et al. | |

FOREIGN PATENT DOCUMENTS

| | | |
|---|---|---|
| GB | 1120147 | 7/1968 |
| GB | 1549841 | 8/1979 |
| WO | WO 00/17245 | 3/2000 |
| WO | WO 03/054040 A1 | 7/2003 |

OTHER PUBLICATIONS

ChemiSens CPA—Application Note 1, "Optimal Production Rate of a PVC Latex Reactor", (1987).
Sabahat Erdogan et al., "Self-Tuning Control of Batch Polymerization Reactor", *Journal of Chemical Engineering of Japan*, vol. 31, No. 4, pp. 499-505, (1998).
A.A. Kiss et al., "Model Predictive Control of Temperature of a PVC Emulsion Process", *Hungarian Journal of Industrial Chemistry*, vol. 27, pp. 117-123 (1999).
U.S. Appl. No. 10/561,165, filed Dec. 16, 2005, Johannes Jacobus Theodorus De Jong et al.
U.S. Appl. No. 10/552,437, filed Oct. 6, 2005, Hendrikus Gerardus Boevenbrink et al.
U.S. Appl. No. 10/553,971, filed Oct. 19, 2005, Hans Westmijze et al.

* cited by examiner

*Primary Examiner*—Fred Teskin
(74) *Attorney, Agent, or Firm*—Kenyon & Kenyon LLP

(57) ABSTRACT

The invention relates to a polymerization process wherein at least one peroxide, with a half life in between 1 hour and 0.001 hour at the polymerization temperature at the moment of dosing, is dosed to the reaction mixture at the polymerization temperature and wherein at least during part of the period in which the peroxide is dosed i) the cooling means of the reactor are kept at essentially maximum cooling capacity and ii) the amount of initiator that is dosed is actively controlled such that the desired polymerization temperature is achieved and maintained within 0.3° C. of said polymerization temperature.

11 Claims, No Drawings

POLYMERIZATION PROCESS INVOLVING THE DOSING INITIATORS

The invention relates to a polymerization process wherein at least one peroxide, with a half life of between 1 hour and 0.001 hour at the polymerization temperature, is dosed to the reaction mixture at the polymerization temperature and wherein at least during part of the period in which the peroxide is dosed i) the cooling means of the reactor are kept at essentially maximum cooling capacity and ii) the amount of initiator that is dosed is actively controlled.

Such a process is known from, inter alia, WO 03/54040. Herein it is disclosed that in a first step of a polymerization process part of the initiator having a half-life of from 0.0001 hour to 0.050 hours at the polymerization temperature is dosed initially in order to reach the desired maximum cooling capacity that is acceptable from a safety point of view at the end of this dosing. In a second step the remaining initiator is dosed to control the polymerization in such a way that the said maximum cooling capacity is matched. The drawback of this process is that the temperature of the reaction mixture may fluctuate strongly around the desired polymerization temperature. Due to these temperature fluctuations, the reproducibility of the polymer obtained in terms of its K-value between different batches is undesirably low. Such a low reproducibility may lead to difficulties in the further processing of the polymer produced, e.g., when the product is extruded, some physical properties of the extrudates will be outside of the required specifications. Consequently, additional measures such as product analysis, separating good-quality from bad-quality products, may be required, rendering the process more expensive. Moreover, the space-time yield of such processes is not optimal.

It is an object of the present invention to provide an improved polymerization process with which it is possible to produce polymers with an increased reproducibility in terms of their K-value.

This object is achieved by using a polymerization wherein at least one peroxide, with a half life in between 1 hour and 0.001 hour at the polymerization temperature at the moment of dosing, is dosed to the reaction mixture at the polymerization temperature and wherein at least during part of the period in which the peroxide is dosed i) the cooling means of the reactor are kept at essentially maximum cooling capacity and ii) the amount of initiator that is dosed is actively controlled by a temperature controller such that the desired polymerization temperature is achieved and maintained within 0.3° C. of said polymerization temperature. Preferably, the polymerization temperature is maintained within 0.2° C. of said polymerization temperature, most preferably within 0.1° C. of said polymerization temperature.

By keeping the polymerization temperature in the indicated temperature range while using the maximum cooling capacity of the reactor, the polymer obtained can be reliably and reproducibly produced in terms of its K-value. Typically, the K-value of the polymer is within 0.3 units of the predetermined K-value, preferably within 0.25 units of the predetermined K-value, most preferably within 0.2 units of the predetermined K-value.

By the term "essentially maximum cooling capacity" is meant that the controller (or controllers) used to regulate the temperature of the reaction mixture is (are) asking for full cooling for, on average, at least 80% of the time, preferably at least 85% of the time, more preferably at least 90% of the time, and even more preferably at least 95% of the time. In a most preferred embodiment, the cooling is at maximum capacity, meaning that all available cooling capacity is used during the dosing period. Preferably, this is achieved by opening a valve which allows the cooling medium to arrive at the polymerization reactor without being restricted by further controlling means. It is to be noted that the maximum capacity as mentioned in this document is higher than the conventional practically useable capacity, which, confusingly, also was called the maximum capacity or full cooling capacity. More specifically, the conventional practically useable maximum capacity was the cooling capacity it was feasible to use in the process without safety margins being violated, hence the conventional term denominated the maximum cooling capacity as used herein minus a small capacity considered necessary for safety reasons, as explained below.

It is noted that the essentially maximum cooling capacity will only be needed during part of the period of the peroxide being dosed. Typically, in another part of the polymerization process, especially during start-up and towards the end of the polymerization, e.g., when the monomer conversion is greater than 80%, for vinyl chloride polymerizations typically in the period that the pressure in the reactor drops, the essentially maximum cooling capacity will not be used.

In the context of the present application the wording "the desired polymerization temperature is achieved" means that the predetermined polymerization temperature is reached from the moment it is possible to maintain it within 0.3° C. of that desired temperature. Generally, the desired temperature is reached after warming of the reaction mixture and the initial temperature overshoot. This size of the initial temperature overshoot is not essential. Generally, the overshoot is less than 6° C. of the desired polymerization temperature, preferably it is less than 4° C., more preferably it is less than 2° C., even more preferably it is less than 1° C., and most preferably it is less than 0.3° C. of the desired polymerization temperature.

It is preferred that the temperature overshoot is the same or differs only slightly for each batch in order to reproducibly obtain polymers having K-values within the above-mentioned variations around the predetermined K-value. The variation of initial temperature overshoots between batches typically is less than 1° C., preferably less than 0.5° C., most preferably less than 0.3° C.

The polymerization temperature is typically controlled by a temperature controller suitable to control the temperature of the reaction mixture within the desired limits of 0.3° C. or less of the predetermined polymerization temperature. Preferably, the temperature controller is selected from the group consisting of a PID controller, a PI controller, a PD controller, and a fuzzy logic controller. Such temperature controllers may use various algorithms such as PID, fuzzy logic or model-based control algorithms.

These temperature controllers are able to control the temperature of the reaction mixture by monitoring the temperature of the reaction mixture and/or the pressure of the gas phase in the polymerization reactor during the polymerization reaction, while at the same time adjusting the dosing rate of the initiator to the reaction mixture. On the basis of the difference between the measured value and the desired value, the temperature controller sends signals to a dosing unit. The dosing unit generally comprises a peroxide storage container, which contains the peroxide to be dosed, and a dose rate controlling means, such as a dosing pump and optionally a flow meter.

Generally, the temperature controller uses an algorithm comprising proportional, integrating, and derivative functions. Such algorithms and functions are known to the man skilled in the art. The input parameters for the algorithms may be temperature and/or pressure. The input parameter for each function of the algorithm may be the same or different. The temperature of the reaction mixture is measured using a temperature sensing device such as a Pt-100 temperature sensor. The pressure of the gas phase in the reactor is measured using a pressure measuring means such as a conventional pressure transducer.

In polymerization processes in which a gas phase is present such as in the (co)polymerization of vinyl chloride (VCM), it is preferred that the input parameter for the proportional and integral functions is the temperature of the reaction mixture, and the input parameter for the derivative function is the pressure of the gas phase.

In conventional polymerization processes the temperature of the polymerization mixture is typically controlled by means of a PID controller. Such PID controllers typically use temperature sensing means and/or pressure measuring means. Generally, the temperature sensing means can measure temperature in the range of 0 to 100° C., and the pressure measuring means can detect pressures in the range of 0 to 20 bars. The PID controller conventionally generates a signal that controls cooling and/or heating means of the reactor. The use of such PID controllers and temperature controlling means will typically result in an accurately controlled temperature of the reaction mixture. However, in a polymerization system according to the invention, in which fast peroxide is being dosed, it was observed that conventional controller systems led to unacceptable temperature variations of up to 2° C. Then, unexpectedly, it was found that a conventional PID controller could be used, provided that the gain is set from the conventional value of from 3 to about 20 to a value of more than 40, preferably more than 60, more preferably more than 65, while it should be less than 150 and preferably less than 100. Very good results were achieved at values of about 80. In this respect it is noted that the proportional band of a PID controller is defined to be 100/gain. Consequently, the proportional band used in the PID controller generally is at least 0.6%, preferably at least 1.0%, and at most 2.5%, preferably at most 1.5%, and most preferably at most 1.25% around the desired temperature.

Therefore, a further embodiment of the invention is a process wherein a conventional PID controller is used the gain or the proportional band of which is set to a value within the ranges presented above. It is noted that temperature sensing means and/or pressure measuring means may be used which can detect temperatures or pressures in a range different from the one described above. In such case, the gain may be adjusted in order to have the proportional band similar to the ones identified above.

It is noted that in processes wherein vinyl chloride (VCM) is (co)polymerized, the pressure initially is proportional to the temperature of the reaction mixture. This is because the pressure in the polymerization reactor is predominantly determined by the vapour pressure of the VCM in the polymerization mixture. Towards the end of the polymerization reaction, the VCM is depleted. At a certain moment no liquid VCM phase is present any longer and the pressure in the reactor starts to drop below the otherwise observed pressure at that temperature. After and/or during the pressure drop VCM is still present in the gas phase, but typically more and more is being adsorbed in the water and the polymer phase of the reaction mixture. The pressure is typically measured in the gas phase of the reactor content, whereas temperature sensing means are typically located below the liquid/gas surface of suspension VCM polymerizations.

The input of the PID controller has traditionally been one or more temperature sensors of the reaction mixture. For preferred polymerization processes wherein at least vinyl chloride is polymerized, it was found to be beneficial that the pressure of the reactor content is used as an input parameter. According to a non-binding theory, it takes quite some time before peroxide that is dosed is well mixed with the total reactor content, which will result in a delay of the temperature measurement. However, it was found that a pressure transducer measures a change in the overall polymerization temperature instantaneously and much faster than the temperature probe does. Therefore, it is contemplated to use the pressure as input parameter for the proportional, integral, and derivative functions of the algorithm used in the temperature controller during the polymerization reaction. Preferably, once the pressure in the polymerization reactor drops, the temperature sensing means will take over control at least partly, and from the pressure drop the temperature is used as input parameter for at least one and preferably for all functions of the algorithm. After a lot of experimental work, it was found that the pressure is not always identical due to inert gases present in the VCM, but that it still is a valuable input parameter if it is used to feed the derivative D of the controller. In such case the temperature controller can be partially based on temperature and pressure at the same time. The most preferred option is the case wherein the P (proportional) and the I (integral) input are coming from one or more temperature sensors and the D (derivative) input from the pressure. Since the pressure transducer reacts much faster than the temperature probe, the proposed control system results in a significantly improved control of the polymerization temperature. The integral and derivative terms typically have classical values, e.g., 999 and 150 seconds.

It was found that with the standard pressure measuring means and the corresponding high gain factors connected to the derivative input signal of the PID controller and the conventional temperature sensing means connected to the proportional and integral input signals of the PID controller, it was possible to maintain the settings not only throughout the time peroxide was dosed, but also during the phase of the process wherein the pressure dropped, without the need to switch back to full conventional temperature control. The temperature rise during the pressure drop phase is kept small due to the high gain factor.

In vinyl chloride polymerizations it is optional to use the input from the pressure sensor during the pressure drop phase of the process. Alternatively, the pressure sensor input is not used in this part of the process, but the derivative function is again linked to a temperature sensor. This will result in a more economical peroxide consumption and absence of the small temperature increase.

In a further preferred embodiment of the present invention, the output of the PID controller is used to control the dosing and/or dosing rate of the initiator. Such a system was found to allow the maximum cooling capacity to be used while still keeping the reaction temperature very close to the predetermined value. We found it possible to control the reaction temperature within 0.2° C., often even within 0.1° C., of the predetermined temperature. If vinyl chloride is polymerized, it is optional to fix or to maximize the initiator dosing at a predetermined level during the pressure drop phase of the process, and not by the controller, and the controller is then used to control the temperature at a fixed value or according to a temperature profile in a conventional way by adjusting the cooling capacity. In this case the peroxide consumption will be more economical but the process time will increase to some extent. If so desired, the PID controller may be part of a split-range controller as known in the art. For example, there may be one part of the controller that steers the cooling capacity and another part that controls the dosing and/or dosing rate.

In another preferred embodiment, all initiator dosing equipment, including piping, tracing equipment, dosing pump, and metering unit, optionally including a refrigeration unit and optionally including an initiator storage tank, and optionally also including a PID controller, is linked together and constructed such that it forms a unit that can be handled and moved independently of the conventional polymerization reactor set-up. This allows such a unit to be installed when necessary, for example if a reactor is to run at full capacity, and to remove the unit in times when a conventional process renders enough polymer. Also, it allows several polymerization reactors to be switched over to the present process independently of one another.

Preferably, the initiator dosing unit comprises:
(a) a temperature controller having at least one temperature input for receiving signals from a temperature sensing means and/or at least one pressure input for receiving signals from a pressure measuring means, and an output for sending signals to a dosing unit; and
(b) a dosing unit comprising a initiator storage container which is connected to a dose rate controlling means.

The dose rate controlling means is known to the man skilled in the art, and generally comprises a dosing pump and optionally a flow meter such as a mass flow meter.

A specific advantage of the process of the invention is the fact that certain conventional safety measures can be refrained from. More specifically, in a conventional process, the reactor is typically equipped with a device that allows the addition of a short-stopper, or radical killer, to the reaction mixture, and/or devices that allow the reactor content to be dumped in cases where the polymerization reaction is thermally running away (meaning that the heat of reaction is greater than can be removed by cooling, causing the polymerization reaction to auto-accelerate). With the present set-up the peroxide dosing is used to control the heat being generated, while cooling is at the (essentially) maximum level. In case the reaction mixture reacts too fast, the controller will dose less of the fast initiator, causing less heat of reaction, and a subsequent run-away is avoided.

Also, a conventional process is typically run slightly below the maximum cooling capacity, even for conventional processes wherein a peroxide was dosed, because the dosing was fixed and some extra spare cooling capacity was required for accidental small changes in polymerization rate and/or for small variations in cooling water temperature (which equates to small changes in polymerization temperature if no countermeasures are taken). For instance, a momentary unexpected increase in peroxide dosing rate, for whatever reason, would increase the heat of reaction above the normal and this would require some extra cooling capacity to avoid overheating. In the present process, the cooling capacity is simply set at the essential maximum, and the peroxide is dosed such that the temperature is controlled. Since now all cooling capacity is used, the overall output of the polymerization reactor can be safely increased.

Another advantage of the present process is that, if necessary, the polymerization can be stopped (by stopping the addition of initiator). The polymerization process can be started again later simply by starting to dose initiator again. The ability to run the polymerization in such a start-stop mode will reduce the amount of polymer and/or monomer that is dumped and it will also result in significantly less down-time of the reactor in case a polymerization process needs to be stopped, for example, in case of an emergency.

Since it is a prerequisite of the present process that the polymerization does not run away when the initiator dosing is stopped, the peroxide being dosed must decompose quickly enough to prevent any build-up in the reaction mixture. In practice this means that all peroxide that is dosed must decompose sufficiently quickly. Suitable initiators for use in the present process include the products as described in WO 00/17245 having a half life in between 1 hour and 0.05 hours at the polymerization temperature. Preferably, the half life of the dosed initiator is less than 0.5 hours, more preferably less than 0.3 hours; and most preferably less than 0.2 hours, all at the polymerization temperature. However, also products as disclosed in WO 02/54040, with a half-life from 0.0001 hour to 0.05 hours at the polymerization temperature, can be used. Most preferably, the half-life of the initiator dosed in the process of the present invention ranges from 0.01 to 0.2 hours at the polymerization temperature. The half-lives of inititiators can be determined by conventional thermal decomposition studies in monochlorobenzene, as is well-known in the art (see for instance the brochure "Initiators for high polymers" with code 10737 obtainable from Akzo Nobel). Preferred examples of organic peroxides used in the process of the invention are 1,1,3,3-tetramethylbutylperoxy methoxy acetate, tert.-butylperoxy methoxy acetate, tert.-amylperoxy methoxy acetate, tert.-butylperoxy ethoxy acetate, diisobutanoylperoxide (Trigonox® 187), hexanoyl pivaloyl peroxide, 2-ethylbutanoyl-isononanoyl peroxide, isobutanoyl-lauroyl peroxide, isobutanoyl-isononanoyl peroxide, bis(tert-butylperoxy) oxalate, cyclododecyl-tert.butylperoxy oxalate, 2,2-bis-2-ethylhexanoylperoxy-4-methylpentane, 2,2-bis-2-ethylbutanoylperoxy-4-methylpentane, 2,2-bis(2,2-dimethylpropanoyl-peroxy)-4-methylpentane, 1-(2-ethylhexanoylperoxy)-1,3-dimethylbutyl-1-peroxy-pivalate (Trigonox® 267) or 2,4,4-trimethylpentyl-2-peroxyneodecanoate (Trigonox® 423), tert-amyl peroxyneodecanoate (Trigonox® 123), tert-butyl peroxyneodecanoate (Trigonox® 23), benzene (m,p)di(2-isopropyl-2-peroxyneodecanoate), 2-methyl-4-hydroxypentane-2-peroxyneodecanoate, α-cumyl peroxyneodecanoate (Trigonox® 99), and peroxydicarbonates such as di-sec-butylperoxydicarbonate (Trigonox® SBP), di(4-tert-butylcyclohexyl) peroxydicarbonate (Perkadox® 16), and di(2-ethylhexyl) peroxydicarbonate (Trigonox® EHP).

Since it can be more efficient not to dose all the initiator, preferably on the basis of the output of the temperature controller, but to add some initiator, which may be one or more initiators and which may be the same or different from the initiator that is dosed, to the reaction mixture at a fixed point in time, for instance at the start of the polymerization process, the present process includes a process wherein one or more initiators are additionally used without being dosed and/or which are added at a fixed time and in a fixed amount.

The present process can be used for various polymerization processes of various (co)monomers. However, it is pre-eminently suited to polymerize monomer mixtures comprising vinyl chloride monomer (VCM). Preferably, the process according to the invention involves the polymerization of monomer mixtures comprising at least 5% by weight (% w/w) of VCM, preferably at least 10% w/w, more preferably at least 20% w/w, and most preferably at least 50% w/w of VCM, based on the weight of all monomer.

Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

The process according to the invention is directed to polymerizing monomer mixtures comprising vinyl chloride monomer (VCM). Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

Also, the polymerization process can be conducted either as a mass process wherein the reaction mixture is predominantly monomer or as a suspension process wherein the reaction mixture typically is a suspension of monomer in water, or as an emulsion or micro-emulsion process wherein the monomer typically is emulsified in water. Preferably, the present process is a mass, suspension or emulsion process. Most preferably, it is a suspension polymerization process. In these processes the usual additives will have to be used. For example, if the monomer is present in the form of a suspension in water, the usual additives like surfactant(s), protective colloid(s), anti-fouling agent(s), pH-buffer(s), etc. may be present. Depending on the type of polymer desired, each of the above-mentioned processes may be preferred. It is to be noted that conventional emulsion and suspension polymerization processes are completely different, not only in terms of the initiating system that is typically used, but also because the process conditions differ greatly.

It is to be understood that the word "dosing" is used to describe the step of adding initiator to the polymerizing reaction mixture at polymerization conditions. The dosing can be done intermittently during the polymerization, meaning that at least two portions of initiator are added to the reaction mixture, or it can be continuous, meaning that for a certain period of time the initiator is continuously added to the reaction mixture, or any combination of these techniques. Examples of a combination of such techniques include, for instance, a process wherein the initiator is first added continuously, then the addition is stopped, and then again it is added continuously. If an intermittent operation is selected, there are at least 2, preferably at least 4, more preferably at least 10, and most preferably at least 20 moments at the polymerization temperature at which the initiator is dosed. Most preferably, the peroxide is dosed continuously and/or intermittently from the start of the polymerization reaction, preferably after at least 5%, less preferably after at least 10%, even less preferably after at least 20% of the monomer(s) has already been polymerized and wherein during the dosing period at least 2, preferably at least 5, more preferably at least 10%, even more preferably at least 20%, more preferably still at least 40%, and most preferably at least 60% of all monomer used in the process is polymerized. As said, it is most preferred to dose the initiator on the basis of the signal coming from the temperature controller while the cooling capacity is kept at its maximum.

The term polymerization temperature as used herein is used in its conventional connotation and represents the temperature that is desired for polymerizing the monomer. Since the temperature may vary, accidentally or on purpose, it is generally taken to be the temperature in the period in which the majority of all monomer (i.e. more than 50% w/w, preferably more than 60% w/w, most preferably more than 75% w/w of the monomer being polymerized) is being polymerized. It is known that the polymerization temperature set-point can be varied over time. Known polymerization temperature variations for polymerizations of vinyl chloride include an intentional higher temperature when the polymerization is started and/or a higher temperature upon pressure drop, both used to increase the reactor output. If a variation in the polymerization temperature is applied, then the polymerization temperature is considered to be the average temperature over time. It is noted that also in the process of the present invention, the polymerization temperature set-point during the start-up and pressure drop stages may be higher than the average polymerization temperature set-point. This could be a fixed value or a temperature profile. For the present process wherein the initiator is dosed, the polymerization temperature is the temperature at the time of dosing.

The dosed initiator can be a redox initiation system. In such a case the reducing agent, the oxidizing agent, or both can be dosed in accordance with the invention. For such redox systems, the half-life of the redox system is the half-life as measured when all components of the system are present. However, in view of the fact that redox systems typically contain heavy metals and/or undesired reducing agents, the initiators of the present invention preferably are not such redox initiation systems. The dosed initiator may be a single initiator or a mixture of several initiators. If a mixture is used, all initiators of said mixture should fulfill the half-life requirement.

The initiator that is dosed to the reactor can be in the pure form or, preferably, in the form of a dilute solution or dispersion (such as a suspension or emulsion). One or more suitable solvents can be used to dilute the initiator. Preferably, such solvents are easily removed during the steps working up the polymer after the polymerization process (such as alcohols), or they are of such a nature that it is acceptable to leave them as a residue in the final polymer. Furthermore, it can be advantageous, but is not necessarily required, that such solvents do not adversely affect the thermal stability of the initiator dissolved therein, as can be verified by analyzing the half-life temperature of the initiator in said solvent. An example of a suitable solvent is isododecane. If an initiator dispersion is dosed, then the dispersion can be of either the initiator itself or of a solution of the initiator, preferably in said suitable solvents. Most preferably, the initiator to be dosed in the present process is an aqueous dispersion. Preferably, the initiator is dosed in a concentration of 0.1 to 60% w/w, more preferably 0.5 to 40% w/w, and most preferably 2 to 30% w/w. The more dilute initiator solutions or dispersions ensure rapid mixing of the peroxide and the polymerization mixture, which leads to a more efficient use of the peroxide. It can be beneficial to also dose the initiator together with a protective colloid.

The total amount of initiator to be used in a process according to the invention is within the range conventionally used in polymerization processes. Typically, from 0.01 to 1% w/w of initiator, more specifically 0.01-0.5% w/w, based on the weight of the monomer(s) to be polymerized, is used. The amount of dosed initiator used preferably is at least 0.01% by weight (% w/w), more preferably at least 0.015% w/w, and most preferably at least 0.02% w/w, all based on the weight of the monomer that is polymerized in the process.

Preferably, the dosing of the initiator can be effected at any suitable entry point to the reactor. If water is added in the course of the polymerization process, for example to compensate for the shrinkage of the reactor content due to the polymerization reaction, it can be advantageous to use the line through which this water is dosed to also dose the initiator. If a feed-line is used for dosing the initiator through, it can be dosed below or above the liquid surface in the reactor. If the reactor is equipped with a condenser, the peroxide can be dosed through said condenser. It is noted that if the formation of the initiator is fast enough, one can dose the raw materials for said initiator into piping or hold-up vessels, from which the initiator is then fed into the polymerization mixture. Alternatively, but less desired, there is the process wherein the raw materials are added to the polymerization mixture. In all instances it can be beneficial to add stirring equipment and/or heat exchangers to the feed lines in order to optimize efficiency.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual initiator, more preferably less than 40 ppm, and most preferably less than 25 ppm of initiator, immediately after drying for 1 hour at 60° C. and screening. The resin was found to exhibit excellent heat stability as measured with a Metrastat® PSD260 testing oven according to method ISO 182-2 (1990E). The improved heat stability proved that the resin hardly discoloured when submitted to melt-processing steps, e.g., to form shaped articles.

The process of the invention is illustrated in the following Examples.

EXAMPLES

Example 1 and Comparative Example A

A conventional vinyl chloride polymerization process wherein the cooling rate was controlled and the peroxide added at the start of the polymerization was compared with a process wherein during part of the polymerization the cooling rate was fixed at the maximum capacity and a PID controller was used to control the dosing rate of the initiator. A significant increase in polymerization rate was observed, allowing shorter reactor times.

Experiments are carried out according to a standard suspension polymerization process, using a 10 l Büchi reactor provided with one baffle, three flat-bladed stirrers at three levels, a pressure transducer (having a pressure response of 1.67 mV/bar), temperature sensing means including a Pt-100 sensor, a vinyl chloride (VCM) feed line, a nitrogen purge line, a peroxide dosing line, and a peroxide injection point. The reactor is charged with 4,700 g of demineralized water, 40.2 g of a 5% solution of Alcotex® B72 (polyvinylacetate/alcohol) in demineralized water, and pressurized with nitrogen to 15 bars. If no leaks are observed, the reactor is evacuated for 5 min at 75 mbara (while stirred) to remove the air, and subsequently charged with 2,870 g of VCM (ex Shin Etsu Pernis), followed by heating the reactor to the desired polymerization temperature of 57° C. in 30–60 minutes. The temperature sensing means were connected to all input signals of the PID controller used to control the temperature.

After reaching a stable temperature, the initial peroxide is added either via the injecting point within 1 minute (conventional—Comparative Example) or dosed over time to the reaction mixture (Example 1). In the Comparative Example the PID controller regulated the flow of heating/cooling means. In Example 1, up to the point when dosing commenced and as of the moment the pressure dropped, the temperature was controlled in a conventional way with the PID controller regulating the flow of heating/cooling means. During the dosing period, the essentially maximum cooling capacity was used and the output of the PID controller was used to control the dosing rate of the initiator.

In the conventional process the maximum polymerization rate (33%//h) was obtained just before the pressure drop phase. The essentially maximum cooling capacity equated to the cooling capacity that was needed at this polymerization rate.

Consequently, during part of the process according to the invention dosing of the (very) fast peroxide through the feed line was done in such a way that the reaction mixture temperature was kept at 57° C. at this cooling capacity. Said cooling capacity and dosing started 0.5–0.65 hours after the reaction medium reached a temperature of 57° C. The polymerization was stopped when a pressure drop of 2 bars was reached, by cooling the reactor and degassing it. After removal of the residual VCM by evacuation, the polymer was obtained by filtration, washing, and drying. When an aqueous dispersion of the initiator is dosed during the process, the expected volume dosed is subtracted from the amount of water added in the beginning, so the total amount of water will be (more or less) the same at the end of the reaction.

Using the experimental set-up as described, a conventional initiator (Trigonox® EHP ex Akzo Nobel) was used as initiator. In Comparative Example A this initiator was used as the sole initiator and it was found that 656 ppm was the maximum amount that could be used with the reaction mixture maintaining the desired reaction temperature of 57° C., even at the absolute maximum cooling capacity.

In Example 1, the initiator, Trigonox® 187 (a di-isobutyryl peroxide formulation ex Akzo Nobel) was dosed continuously during the polymerization process as a diluted aqueous dispersion. The used parameters for the conventional process and the process with continuous initiator dosing are mentioned in Table 1. The time till pressure drop (CPT), as well as the time till the pressure had dropped to a value two bars below the pressure at the start of the pressure drop, is also reported as a measure of the polymerization rate.

The amount of polymer obtained is presented as the yield on monomer (yield). The table furthermore presents the average polymer particle size (psd).

TABLE 1

| Ex. No. | Initiator | (ppm) | Used PID parameters | CPT (min) | Time to −2 bar (min) | Yield (%) | Psd (μm) |
|---|---|---|---|---|---|---|---|
| A | Tx EHP | 656 | P expressed as Gain: 14<br>I: 637 sec<br>D: 106 sec | 197 | 226 | 83 | 155 |
| 1 | Tx 187 | 940 | P expressed as Gain: 80<br>I: 999 sec<br>D: 150 sec | 150 | 180 | 86 | 154 |

From these results it follows that much shorter process times are attainable with the continuous initiator dosing compared to conventional processes.

Example 2 and Comparative Example B

In Example 2 and Comparative Example B the experimental set-up of Example 1 is used. The initiator used in both Examples is Trigonox® 187. The parameters of the PID controller used during the experiments are shown in the Table below.

TABLE 2

| Ex. No. | Used PID parameters | CPT (min) | Time to −2 bar (min) | Yield (%) | K-value |
|---|---|---|---|---|---|
| B | P expressed as Gain: 9<br>I: 999 sec<br>D: 150 sec | 130 | 165 | 84 | 67.4 |
| 2 | P expressed as Gain: 80<br>I: 999 sec<br>D: 150 sec | 125 | 158 | 84 | 67.0 |

In Example 2 the temperature of the reaction mixture is kept within 0.2° C. of the predetermined polymerization temperature of 57° C. In Comparative Example B the reaction mixture is kept within 2° C. of the predetermined temperature, and only after 90 minutes from reaching the polymerization temperature after start-up is the temperature controlled within 0.3° C. of the predetermined temperature. From Table 2 it can be deduced that the time till pressure drop (CPT) as well as the time till the pressure had dropped to a value two bars below the pressure at the start of the pressure drop is lower for Example 2 than for Comparative Example B. Furthermore, the K-value of the product of Comparative Example B is higher than the desired K-value of 67.0, which desired value is obtained for the product of Example 2.

The invention claimed is:

1. A polymerization process comprising:
achieving a desired polymerization temperature of a reaction mixture in a reactor;
dosing at least one peroxide over a period of time to the reaction mixture at the desired polymerization temperature, the peroxide having half life in between 1 hour and 0.001 hour at the desired polymerization temperature, wherein at least during part of the period in which the peroxide is dosed:
cooling means of the reactor are kept at essentially maximum cooling capacity; and
the amount of initiator that is dosed is actively controlled by a temperature controller such that the temperature of the reaction mixture is achieved and maintained within 0.3° C. of the desired polymerization temperature.

2. The polymerization process of claim 1 wherein the temperature of the reaction mixture is maintained within 0.2° C. of the desired polymerization temperature.

3. The polymerization process of claim 1 wherein the temperature controller controls the temperature of the reaction mixture by monitoring the temperature of the reaction mixture and/or the pressure of any gas phase in the reactor during the polymerization reaction, while at the same time adjusting the dosing rate of the initiator to the reaction mixture.

4. The polymerization process of claim 1 wherein the polymer obtained has a K-value within 0.3 units of the desired K-value.

5. The polymerization process of claim 1 wherein the temperature is controlled by a temperature controller selected from the group consisting of a PID controller, a PI controller, a PD controller, and a fuzzy logic controller.

6. A polymerization process according to claim 5 wherein the controller is a PID controller using a proportional band, and the proportional band of the PID controller is in the range of from 0.6% to 2.5%.

7. A polymerization process according to claim 6 wherein temperature sensing means are linked to the proportional and integral input signals of the PID controller and wherein reactor pressure sensing means are linked to a derivative function of the PID controller during at least part of the period in which the peroxide is dosed.

8. A polymerization process according to claim 1 wherein vinyl chloride is polymerized, optionally together with other monomers.

9. A polymerization process according to claim 1 wherein the polymerization process is a suspension polymerization process.

10. The polymerization process of claim 1, wherein the temperature of the reaction mixture is maintained within 0.1° C. of the desired polymerization temperature.

11. The polymerization process of claim 1, wherein the polymer obtained has a K-value within 0.2 units of the desired K-value.

* * * * *